United States Patent [11] 3,612,579

| [72] | Inventor | Harry L. Groves |
|---|---|---|
| | | Houston, Tex. |
| [21] | Appl. No. | 879,097 |
| [22] | Filed | Nov. 24, 1969 |
| [45] | Patented | Oct. 12, 1971 |
| [73] | Assignee | National Coupling Company, Inc. |
| | | Houston, Tex. |

[54] RETAINER MEANS FOR HOSE COUPLING
4 Claims, 5 Drawing Figs.

[52] U.S. Cl. .................................................... 285/70,
285/81, 285/316, 285/330
[51] Int. Cl. ............................................ F16l 55/00
[50] Field of Search ........................................... 285/81, 82,
89, 91, 316, 70, 330

[56] References Cited
UNITED STATES PATENTS
1,303,367  5/1919  Nelson .......................... 285/70

3,359,015  12/1967  Zahuranec .................. 285/316 X
FOREIGN PATENTS
21,009  8/1935  Australia ...................... 285/91

Primary Examiner—Dave W. Arola
Attorneys—Bertram H. Mann, Frank B. Pugsley, James G. Ulmer, Delmar L. Sroufe, Robert A. White and Larry B. Feldcamp ABSTRACT: A hose coupling of the type having interlatching retainer jaws which may be held in latched relationship by one or a pair of opposed, resiliently biased collars is provided with a secondary retainer element in the form of a wire or snap ring which is applied to the coupling in position to resist detachment of the latching jaws. This element may encompass and directly block the jaws themselves or the coupling body adjacent the collar or one of the collars to prevent its retraction.

PATENTED OCT 12 1971 3,612,579
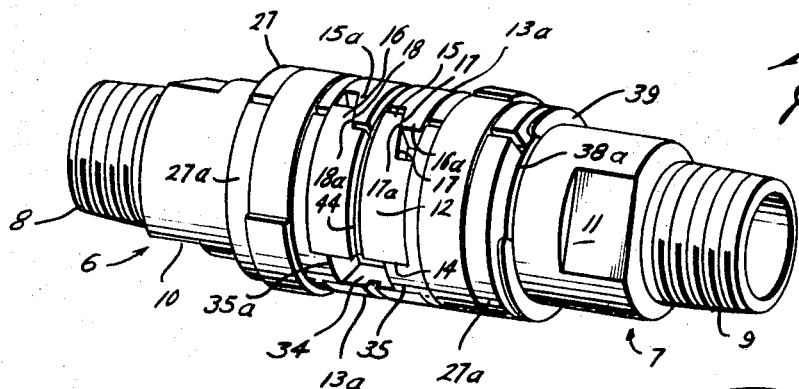
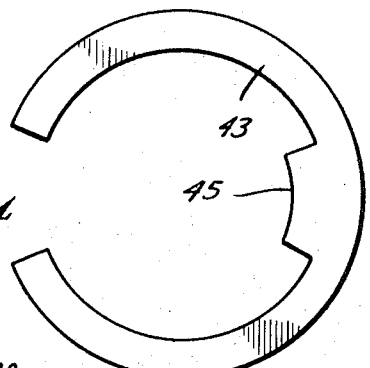
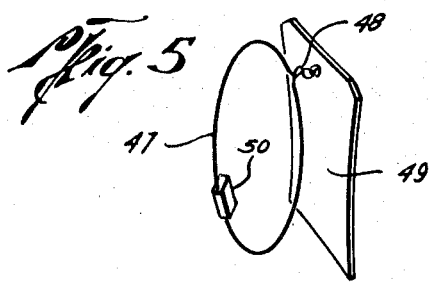
Harry L. Groves
INVENTOR.
BY Bertram A. Mann
ATTORNEY

RETAINER MEANS FOR HOSE COUPLING

BACKGROUND OF THE INVENTION

This invention relates to hose couplings of the quick connect and disconnect type and consists particularly in novel retainer means to prevent unauthorized unlatching and/or disengagement thereof. A coupling of this general type is illustrated in expired U.S. Pat. No. 1,303,367 issued to John T. Nelson. In the Nelson patent, identical locking or latching face members are formed upon the abutting ends of tubular body members which, in turn, are secured to the ends of hose sections to be connected thereby. The locking members have complementary latching fingers which are brought into latching interengagement by relative longitudinal and rotational movements. Latching collars resiliently mounted on the body members in back of the locking collars have axially projecting abutments which engage the locking members in such manner as to resist relative rotation thereof in the direction as is necessary to effect unlatching of the coupling. A workman may disengage the coupling by withdrawing or retracting the collars away from the locking members. It has been found that unlocking of the Nelson type of coupling, being relatively simple and quick, does not provide sufficient security, particularly where the hose is used for transmitting poisonous gases or other fluids.

SUMMARY OF The INVENTION

Accordingly, it is an object of the present invention to provide additional retainer and security means for a coupling of the general type disclosed in the Nelson patent. According to one form of the invention, a snap ring or key, consisting of a partial ring of more than 180°, is snapped into a groove behind at least one of the retainer collars in the locked position of the coupling. While this additional ring can be removed, for instance, with the use of a prying tool such as a screw driver, its provision necessitates the exercise of an additional conscious effort with the resultant additional security. According to another form of the invention, a generally similar snap ring may be inserted in a groove about the interlatched locking members, the ring in this instance having an inward projection, for instance, a lug, which engages one or both of the locking members to prevent unlatching rotation thereof. According to a third form of the invention, a flexible wire is received in a groove about the locking jaw members and also carries a lug or inward projection for interfering with unlatching rotation of the locking members. This type of wire may be used for attachment of a warning tag and may be applied and removed, respectively, by twisting together and untwisting the wire ends.

BRIEF DESCRIPTION OF THE DRAWINGS

In the accompanying drawings which illustrate the invention,

FIG. 1 is a perspective view of the improved coupling showing one form of additional retainer element applied thereto.

FIG. 2 is a perspective view of the retainer element utilized in FIG. 1.

FIG. 3 is a sectional view through the latching parts of the coupling and showing a modified form of the supplementary retainer means.

FIG. 4 is an elevation of the snap ring used in FIG. 3.

FIG. 5 is a perspective view showing still another form of retainer means.

DESCRIPTION OF THE PREFERRED EMBODIMENT

The coupling shown in locked perspective in FIG. 1 and in cross section in FIG. 3 comprises a pair of tubular body members 6 and 7 provided with terminal threading 8 and 9 for attachment to hose ends, and wrench flats 10 and 11. These tubular body members and their respective coupling means, preferably, are identical, as disclosed in the Nelson patent. The coupling parts provided on body member 6 will be described and the corresponding parts on body member 7 identified by the same reference numerals with the suffix letter "a." Each jaw member 12, 13 has a radial-longitudinal, generally flat wall 14 at one edge and a pair of latching fingers 15 and 16 along the other edge having inclined, rearwardly facing surfaces 17 and 18. The internal bores 19 and 19a of the tubular body members are provided with terminal sealing bushings 20 and 20a.

Broad, annular grooves 24 and 24a surround the body members inwardly of the locking jaw members forming radial, circumferential shoulders 25 and 26. A split collar 27 has a forward flange 28 normally urged against shoulder 25 by a coiled compression spring 29. The rear or inner end of spring 29 bears against shoulder 26, while the corresponding end of split collar 27 slidably confronts circumferential surface portion 30. The split collar is secured in position about groove 24 by means of an annular leaf spring 31.

Each locking jaw member extends circumferentially sufficiently less than 90° so that in the interfitting latched position, as in FIG. 1, there is a radial notch or clearance between the adjacent radial edges 14 thereof, as at 34. Projecting into each of these notches are outwardly or forwardly projecting lug elements 35 and 36 and the diametrically opposed lugs (not shown) on split collars 27 and 27a. These lug elements lock jaw members 12 against relative rotation as is necessary for unlocking action.

In the locked position, complementary fingers 15, 16 and 15a, 16a interfit with their inclined edges 17, 17a and 18, 18a abutting and drawing together bushings 20, 20a on the tubular body members by wedging action.

When collar members 27, 27a are retracted against springs 29, 29a, lug elements 35, 35a will be withdrawn axially from notches 34. Then, upon continued application of retracting force to the split collars, abutting inclined edges 17, 17a and 18, 18a on the latching fingers will cause rotation of the jaw members by inclined plane action and resultant release of the coupling. In order to assemble and lock the coupling, the locking jaws on one body member are inserted between the jaws of the complementary body member, then urged together with sufficient force to bring the fingers into complementary registration, then rotated. When lugs 35, etc., are aligned with notches 34, the lugs are forced into the notches by springs 29 and 29a.

The additional retainer means of the present invention are provided for the purpose of rendering such uncoupling more difficult and, accordingly, less likely to be effected by inadvertent or unauthorized actions. According to the form of the invention in FIG. 1, there is provided an annular groove 38 just inwardly or rearwardly of the inner end of split collar 27 in its locked position. There is received in this groove the snap ring 39 shown in FIG. 2 which has recesses 40 and 41 in its inner edge for reception of a screwdriver or other prying tool to be used in removing the ring from the groove. Ring 39, being of resilient material, may be snapped into and out of its locking position as shown. With ring 39 positioned as in FIG. 1, retraction of split collar 27 in a manner to withdraw lug elements 35 from notches 34 is prevented so that the coupling cannot be released until additional retainer ring 39 is removed.

FIGS. 3 and 4 show a generally similar retainer snap ring 43 received in an annular groove 44 extending about the peripheral surfaces of the locking jaw members 12, 12a, 13, and 13a, as shown in FIG. 1. Ring 43 has a radial inward projection 45 which is received in one of the notches so as to prevent relative rotation of the latching jaws.

A third form is shown in FIG. 5 which comprises a flexible wire 47 for reception snugly about and within groove 44 and is provided with twisted-together ends 48. A tag 49 bearing, for instance, a warning or danger notation, may be attached to the wire. The wire carries an inwardly projecting lug element 50 which will be received in one of the notches 34 for resisting relative rotation of the locking jaws.

Accordingly, in each form there is provided supplemental retainer means which requires an additional conscious effort in effecting unlocking of the coupling parts. Thus, inadvertent or unauthorized uncoupling is rendered less likely, this being a very important feature, particularly where a dangerous gas is being transported. Usually only one of the supplemental retainer devices will be needed and utilized. The invention may be modified as will occur to those skilled in the art, and the exclusive use of all modifications as come within the scope of the appended claims is contemplated.

I claim:

1. The combination in a hose coupling having a pair of complementary tubular body parts and locking structure for holding said parts in end-to-end abutment, a plurality of circumferentially spaced locking members projecting axially from each body part and adapted for interfitting relationship, latching finger means on axial edges of said members adapted for latching interengagement and disengagement upon relative rotation of said members when in said relationship, retainer collars slidably and nonrotably mounted on said body parts and with structure insertable between said locking members when in locking engagement for resisting relative rotation and disengagement thereof, and additional retainer means comprising a circular element extending about the interfitting locking members and having locking structure also projecting between said members.

2. The combination described in claim 1 further including a circumferential groove extending about the outer surfaces of said locking members and stably receiving said circular element.

3. The combination described in claim 2 in which said circular element is formed of a flexible wire.

4. The combination described in claim 2 in which said circular element consists of a resilient ring extending more than 180° but less than 360° about said groove.